(12) United States Patent
Ichii

(10) Patent No.: US 9,348,134 B2
(45) Date of Patent: May 24, 2016

(54) OPTICAL SCANNING UNIT, AND APPARATUS INCLUDING THE OPTICAL SCANNING UNIT

(71) Applicant: Daisuke Ichii, Kanagawa (JP)

(72) Inventor: Daisuke Ichii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/456,161

(22) Filed: Aug. 11, 2014

(65) Prior Publication Data

US 2015/0055204 A1    Feb. 26, 2015

(30) Foreign Application Priority Data

Aug. 23, 2013  (JP) ................................ 2013-172892

(51) Int. Cl.
| | | |
|---|---|---|
| *G02B 26/08* | (2006.01) | |
| *G02B 26/10* | (2006.01) | |
| *G02B 27/00* | (2006.01) | |
| *G02B 27/01* | (2006.01) | |

(52) U.S. Cl.
CPC ........ *G02B 26/0833* (2013.01); *G02B 26/0841* (2013.01); *G02B 26/101* (2013.01); *G02B 27/0018* (2013.01); *G02B 27/0101* (2013.01)

(58) Field of Classification Search
CPC ............. G02B 26/105; G02B 26/0833; G02B 26/0841
USPC ...................... 359/212.1–214.1, 223.1–226.1
See application file for complete search history.

(56) References Cited

U.S. PATENT DOCUMENTS

| | | | |
|---|---|---|---|
| 7,948,667 B2* | 5/2011 | Uchikawa | ............ G02B 26/105 359/212.1 |
| 2006/0050348 A1 | 3/2006 | Shimomura | |
| 2008/0239531 A1 | 10/2008 | Schenk et al. | |
| 2009/0073526 A1 | 3/2009 | Uchikawa | |
| 2009/0278907 A1 | 11/2009 | Igarashi | |
| 2013/0215487 A1 | 8/2013 | Konuma et al. | |

FOREIGN PATENT DOCUMENTS

| | | |
|---|---|---|
| EP | 0 423 812 A2 | 4/1991 |
| JP | 2006-221171 | 8/2006 |
| JP | 2009 157182 A | 7/2009 |
| JP | 2010-145746 | 7/2010 |
| JP | 2013-041182 | 2/2013 |
| WO | WO 2013/108252 A1 | 7/2013 |

OTHER PUBLICATIONS

Extended European Search Report issued Dec. 10, 2014 in Patent Application No. 14180865.9-1562.
Office Action issued Mar. 24, 2016 in Chinese Patent Application No. 201410383706.0.

* cited by examiner

*Primary Examiner* — Euncha Cherry
(74) *Attorney, Agent, or Firm* — Oblon, McClelland, Maier & Neustadt, L.L.P

(57) ABSTRACT

An optical scanning unit includes a light source, an optical deflector that includes a light transmission window disposed on a light path from the light source and a rotatable mirror that includes a reflecting surface to reflect light that goes through the light transmission window into the light transmission window and to deflect the light from the light source toward a surface, and a light shield disposed on a light path of reflected light of the light from the light source reflected by a surface of the light transmission window.

16 Claims, 10 Drawing Sheets

OPTICAL SCANNING UNIT, AND APPARATUS INCLUDING THE OPTICAL SCANNING UNIT

CROSS-REFERENCE TO RELATED APPLICATION

This patent application is based on and claims priority pursuant to 35 U.S.C. §119 to Japanese Patent Application No. 2013-172892, filed on Aug. 23, 2013 in the Japan Patent Office, the entire disclosure of which is hereby incorporated by reference herein.

BACKGROUND

1. Technical Field

The present invention relates to an optical scanning unit, and an apparatus including the optical scanning unit such as an image forming apparatus or a vehicle.

2. Background Art

Conventionally, an optical scanner package that scans a surface using light from a light source is known.

The optical scanner package includes a light transmission window disposed on a light path from the light source and a rotatable mirror that reflects the light transmitted through the light transmission window to the light transmission window. The light scanner package also includes an optical deflector that deflects the light from the light source to the surface. With the light from the light source, an irregular image, such as a virtual image, may be generated on the surface.

SUMMARY

An example embodiment of the present invention provides an optical scanning unit that includes a light source, an optical deflector that includes a light transmission window disposed on a light path from the light source and a rotatable mirror that includes a reflecting surface to reflect light that goes through the light transmission window into the light transmission window and to deflect the light from the light source toward a surface, and a light shield disposed on a light path of reflected light of the light from the light source reflected by a surface of the light transmission window.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
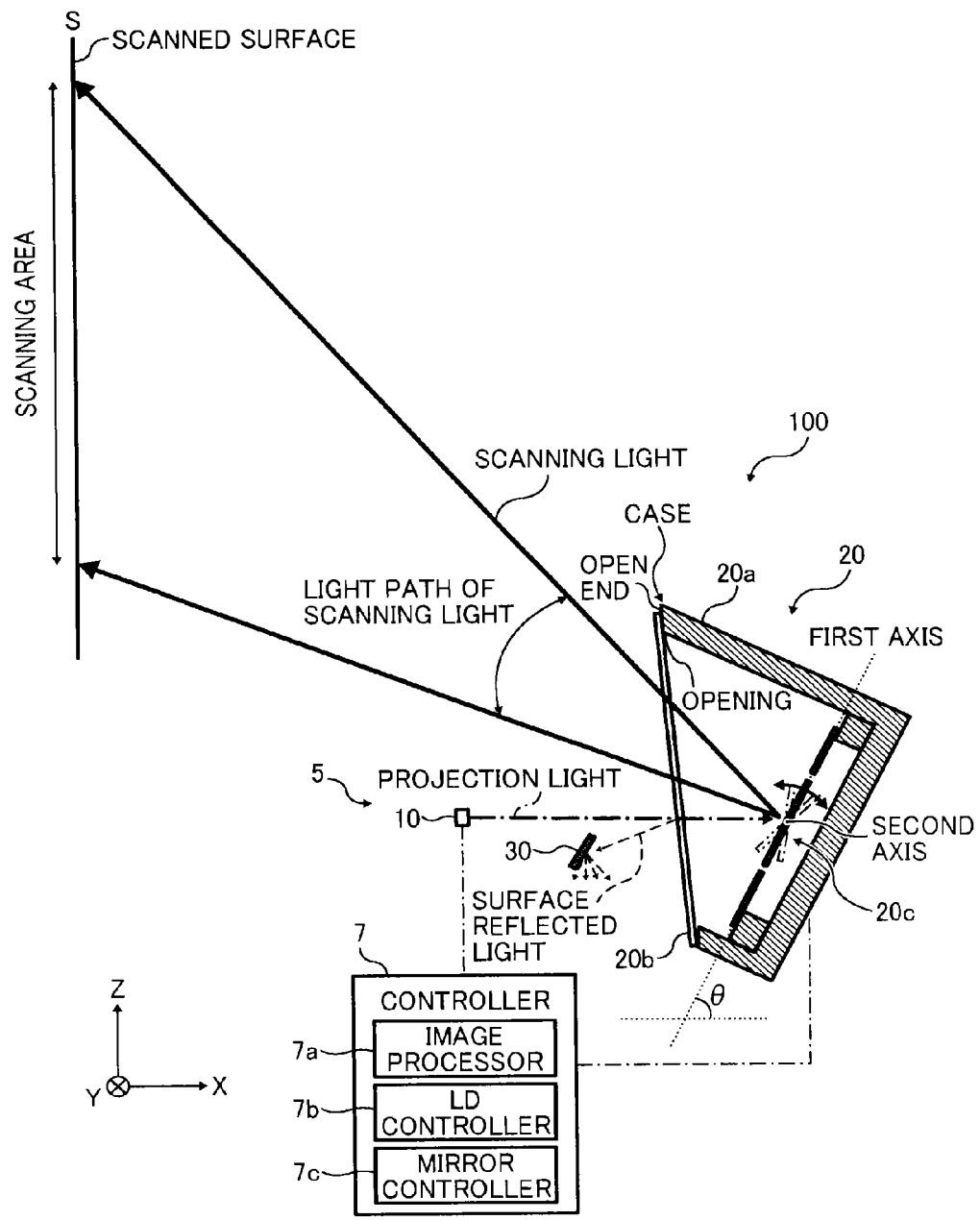
FIG. 1 is a schematic diagram illustrating a projector as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following embodiments provide an optical scanning unit that scans the surface using light and includes a light source, a light transmission window disposed on a light path from the light source, and a rotatable mirror that reflects the light transmitted through the light transmission window to the light transmission window. The optical scanning unit further includes an optical deflector that deflects the light from the light source to the surface and a lightproof unit disposed on a light path of reflected light of the light from the light source on the surface of the light transmission window.

First, a first embodiment of the present invention is described below with reference to FIG. 1, FIG. 2, and FIG. 3.

FIG. 1 is a schematic diagram illustrating a projector 100 in this embodiment. The projector 100 is mounted on a floor of a building or a table, suspended from a ceiling of a building, or hanging from a wall of a building, etc. In the following description uses an XYZ three-dimensional orthogonal coordinate system with the vertical direction shown in FIG. 1 as the Z axis.

As shown in FIG. 1, the projector 100 includes an optical scanning unit and controller 7.

The optical scanning unit 5 includes a Laser Diode (LD) 10 as a light source, an optical deflector 20, and a light shield 30.

The LD 10 emits laser beam in +x direction. The laser beam emitted from the LD 10 is referred to as "emitted light" hereinafter.

The optical deflector 20 includes a container that includes a package 20a, a glass cover 20b, and a mirror 20c contained in the container. Here, for example, it is assumed that the X-Z cross-section of the container is nearly trapezoidal.

The package 20a is a box without a lid, and it is mounted so that its open side is disposed on a light path of the emitted light (facing −x direction). Ceramic, plastic, or aluminum may be used as the material of the package 20a. Here, the package 20a consists of a member whose X-Y cross-section is J-shaped for example, and the package 20a includes electrical wiring to supply power to a driving unit described later.

The glass cover 20b consists of transparent or translucent glass plates, and the glass cover 20b is joined to the opening end of the package 20a so that the glass cover 20b covers the opening of the package 20a. That is, the glass cover 20b is disposed on the light path of the emitted light, and the glass cover 20b functions as a light transmission member. In this case, for example, the glass cover 20b is disposed parallel to the Y-axis.

The mirror 20c is a so-called micro-electromechanical system (MEMS) mirror and is supported inside the package 20a independently rotatable about a first axis and a second axis perpendicular to the package 20a, so that its reflecting surface is disposed on the light path of the emitted light that goes through the glass cover 20b. In this case, the first axis extends to the direction parallel to xz plane slanted at a predetermined angle θ against xy plane. The second axis is parallel to y axis. By being contained in the container, the mirror 20c is shielded from fresh air and protected from dust and humidity.

The configuration of the mirror 20c is described in detail below. As shown in FIG. 2, the mirror 20c is supported by a first frame member rotatable around the first axis via a torsion bar inside the first frame member. The first frame member is supported by a second frame member rotatable around the second axis via a torsion bar inside the second frame member. The mirror 20c can be driven by a driving unit (actuator, not shown in figures) within a first range around the first axis and a second range around the second axis independently. The second frame member is supported by the package 20a. Here, the first range (the first angular range) is larger than the second range (the second angular range). An electromagnetic driving unit or a piezoelectric driving unit can be used. The configuration in which the mirror 20c is rotatable about the first axis and the second axis independently described above is an example, and it is not limited to that. In FIG. 2, the container is omitted.

The optical deflector 20 can be manufactured by mounting the mirror 20c on the package 20a (a MEMS process) and by joining the glass cover 20b to the package 20a (a sealing process) sequentially.

In the optical scanning unit 5 configured as described above, the laser beam from the LD 10 is incident on the surface of the glass cover 20b (−x side surface), and the light that goes through the glass cover 20b is incident on the reflecting surface of the mirror 20c. The laser beam incident on the reflecting surface of the mirror 20c is toward the glass cover 20b in accordance with the position of the mirror 20c around the first axis and the second axis, and the laser beam is incident on the back surface of the glass cover 20b (+x side surface). The laser beam that goes through the glass cover 20b among the laser beams incident on the back surface of the glass cover 20b is conducted to the surface (the surface of the screen S).

Figure 2:
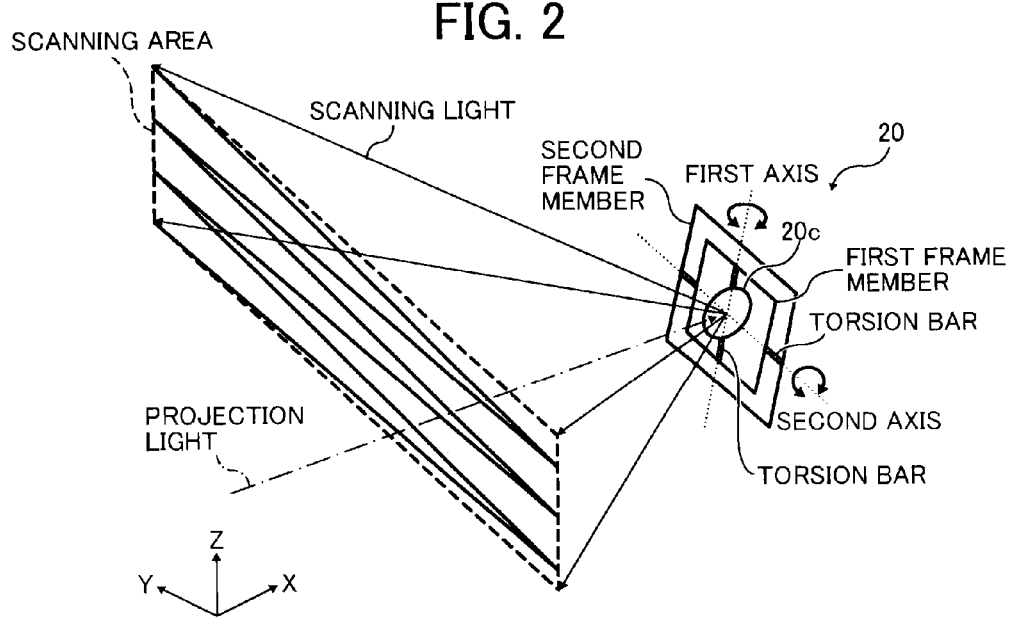
FIG. 2 is a diagram illustrating a configuration and operation of an optical deflector shown in FIG. 1 as an embodiment of the present invention.

In this case, for example, by oscillating the mirror 20c at high frequency around the first axis and at low frequency around the second axis, it is possible to scan a predetermined region on the surface two-dimensionally (with reference to FIG. 2). That is, by scanning in the main scanning direction corresponding around the first axis at high speed and scanning in the sub-scanning direction corresponding around the second axis at low speed, it is possible to perform raster scanning on the region described above.

Here, the region is nearly rectangular, with the main scanning direction around the first axis (y axis direction) as the longitudinal direction and the sub-scanning direction around the second axis (z axis direction) as the lateral direction.

Returning to FIG. 1, the controller 7 includes an image processor 7a, a LD controller 7b, and a mirror controller 7c. The image processor 7a performs predetermined processes (such as distortion correction, image resizing, and resolution conversion) on image data sent from an external apparatus such as personal computers and transfers the processed image data to the LD controller 7b.

Based on the image data sent from the image processor, the LD controller modulates the driving signal (pulse signal) and outputs it to the LD 10. In addition, based on a synchronizing signal sent from the mirror controller 7c (described later), the LD controller 7b determines timing for illuminating the LD 10 (timing for supplying the driving signal to the LD 10).

Based on a detection signal from a sensor that detects positional information of the mirror 20c around the first axis and the second axis, the mirror controller 7c outputs a synchronization signal for synchronizing oscillation of the mirror 20c to illuminate the LD 10 of the LD controller 7b.

In the projector 100 configured as described above, the laser beam modulated based on the image data is emitted from the LD 10 and deflected to the surface by the optical deflector 20. As a result, the predetermined region on the surface is scanned in the main scanning direction and the sub-scanning direction two-dimensionally, and a desired image is formed on the region.

Semiconductor lasers can achieve high optical efficiency due to high directionality, and are suitable for use as the light source of the scanning projector described in this embodiment.

Figure 4:
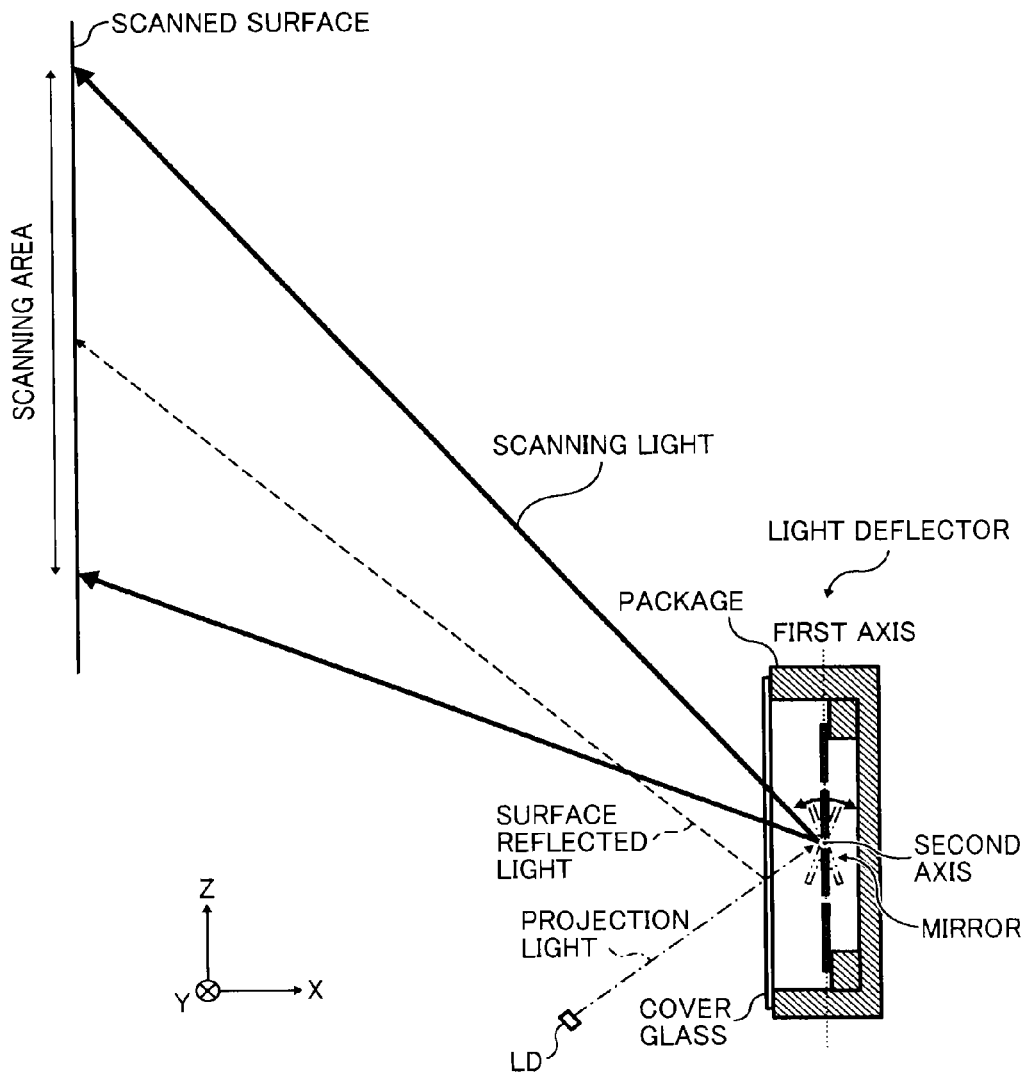
FIG. 4 is a diagram illustrating a comparative projector.

However, after the emitting beam enters into the surface of the glass cover 20b, a part of the emitting beam transits the glass cover 20b, and the remaining emitting beam (e.g., less than several percent) is reflected by the surface of the glass cover 20b and becomes backlight (as shown in FIG. 4).

The backlight generated by the laser beam from the LD 10 has high intensity and visibility due to its high directionality. If the backlight not deflected by the optical deflector 20 (static beam) is generated against the laser beam deflected by the optical deflector 20 (dynamic beam), it becomes visible since it becomes brighter relatively, and that degrades the image quality.

To cope with this issue described above, in this embodiment, the glass cover 20b and the mirror 20c are mounted so that the light path of the surface reflected light deviates from the region in the sub-scanning direction (z direction).

The relative positions of the glass cover 20b and the mirror 20c is described in detail below.

The mirror 20c is disposed at an arbitrary position within the first range around the first axis and within the second range around the second axis. The reflecting surface of the mirror 20c is not in the surface of the glass cover 20b. In this case, regardless of the position of the mirror 20c around the first axis and the second axis, the reflecting surface of the mirror 20c does not become parallel to the surface of the glass cover 20b, and the surface reflected light can be prevented from entering into the region.

Figure 3:
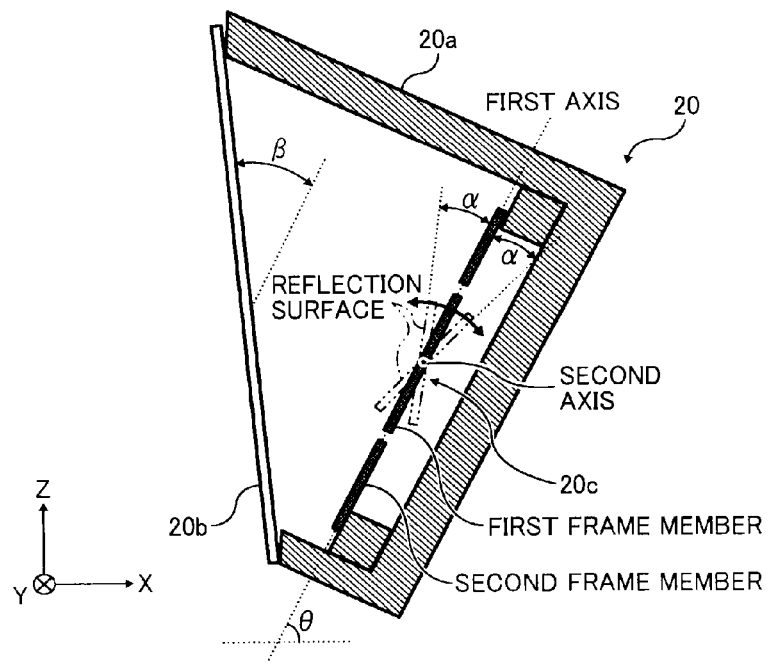
FIG. 3 is a diagram illustrating a configuration of the optical deflector as an embodiment of the present invention.

More specifically, as shown in FIG. 3, a maximum swinging angle α of the mirror 20c (acute angle) from a reference plane around the second axis (a swinging pivot) is smaller than an angle β between the surface of the glass cover 20b and a plane that is parallel to the reference plane (acute angle), i.e., an angle between the glass cover 20b and the reference plane. Here, it is assumed that the reference plane described above includes the first axis and the second axis.

As shown in FIG. 1, the light path of the laser beam from the LD 10 (the emitted light) and the light path of the surface reflected light are in the same side as the laser beam deflected by the optical deflector 20 (the scanning beam) from the viewpoint of −y direction. That is, the light path of the emitted light and the light path of the surface reflected light are in the opposite side from the light path of the scanning light against a predetermined virtual plane parallel to y axis.

In this case, since it is possible to make an incidence angle of the emitted light into the glass cover 20b small, it is possible to improve transmittance of the emitted light that enters into the glass cover 20b. Consequently, it is possible to enhance the optical usage efficiency.

As shown in FIG. 1, regarding the relative positions of the glass cover 20b and the mirror 20c, the light path of the emitted light and the light path of the scanning light are in the same side as the light path of the surface reflected light from the viewpoint of −y direction. That is, the light path of the emitted light and the light path of the scanning light are in the opposite side from the light path of the surface reflected light against a predetermined virtual plane parallel to y axis.

In this case, the light path of the surface reflected light can be away from the region sufficiently. If the light path of the surface reflected light is around to the region, the surface reflected light is scattered by other members around the region, and it is possible that the scattered surface reflected light enters into the region with relatively high intensity.

Here, if the surface reflected light returns to the LD 10, the laser oscillation of the LD 10 becomes unstable, and its output fluctuates. As a result, it is impossible to scan the surface stably.

To cope with this issue, in this embodiment, as shown in FIG. 1, the light shield 30 described above is disposed on the light path of the surface reflected light. The light shield 30 is mounted so that it can reflect the incident surface reflected light into a direction away from the light path of the emitted light.

It is preferable that the incidence plane of the light shield 30 (the surface where the surface reflected light enters into) is a plane that reflects light diffusively (e.g., a rougher surface). Otherwise, the light shield 30 can absorb at least a part of the surface reflected light, or the light shield can transmit a part of the surface reflected light. If the light shield 30 can absorb most of the surface reflected light, the posture of the light shield 30 can be arbitrary.

As described above, the optical scanning unit 5 in this embodiment includes the LD 10, the glass cover 20b disposed on the light path of the laser beam (emitted light) from the LD 10, and the rotatable mirror 20c that reflects the laser beam that goes through the glass cover 20b into the glass cover 20b. The optical scanning unit 5 also includes the optical deflector 20 that deflects the laser beam from the LD 10 into the surface and the light shield disposed on the light path of the surface reflected light that the surface of the glass cover 20b reflects the laser beam from the LD 10.

In this case, since the surface reflected light is shaded by the light shield 30, the surface reflected light can be prevented from entering into the region on the surface, and the surface reflected light can be prevented from returning to the LD 10.

As a result, the irregular image, such as a virtual image, is prevented from being generated on the surface. Further, the above-described optical scanning unit is able to scan the surface stably.

More specifically, the mirror 20 is rotatable within a first range around the first axis and a second range around the second axis. If the mirror 20c is located at an arbitrary position within the first range and the second range, the reflecting surface of the mirror 20c is not parallel to the surface of the glass cover 20b.

By contrast, in the optical scanning device to be compared shown in FIG. 4, the optical deflector has a so-called flat package, and the reflecting surface of the mirror located at a predetermined position within the range is parallel to the surface of the glass cover.

In this case, the surface reflected light enters into around the center of the region, and that is recognized as a bright spot around the center of the image (i.e., the irregular image is generated.) To cope with this issue, it is possible to keep distance from the mirror to the glass cover long enough and keep the light path of the surface reflected light away from the scanning light. However, that results in enlarging the package and increasing cost. Even if the glass cover is tilted slightly against the mirror, i.e., at an angle smaller than the maximum swinging angle of the reflecting surface, the surface reflected light enters into the surroundings of the region, and that is recognized as a bright spot surrounding the image (i.e., the irregular image is generated.)

It is necessary to keep the height of the package 20a (length of a longer edge of the two edges that parallel to each other on xz cross-section of the package 20a) long in order to make a tilt angle of the glass cover 20b against the reference plane (the plane that includes the first axis and the second axis) large. Consequently, it becomes difficult to process the package 20a, and that results in enlarging the optical deflector 20 and increasing cost.

To cope with this issue, in the optical deflector 20, regarding the mirror 20c, the light path of the surface reflected light is deviated from the region in the sub-scanning direction (z axis direction) corresponding to the direction around the second axis (around the axis whose range is smaller) among the direction around the first axis and the direction around the second axis.

In this case, compared to a case in which the light path of the surface reflected light is deviated from the region in the main scanning direction (y axis direction) corresponding to the direction around the first axis (around the axis whose range is larger), it is possible to make the tilt angle of the glass cover 20b against the reference plane. Consequently, it is possible to prevent the optical deflector from enlarging and increasing cost.

Figure 5:
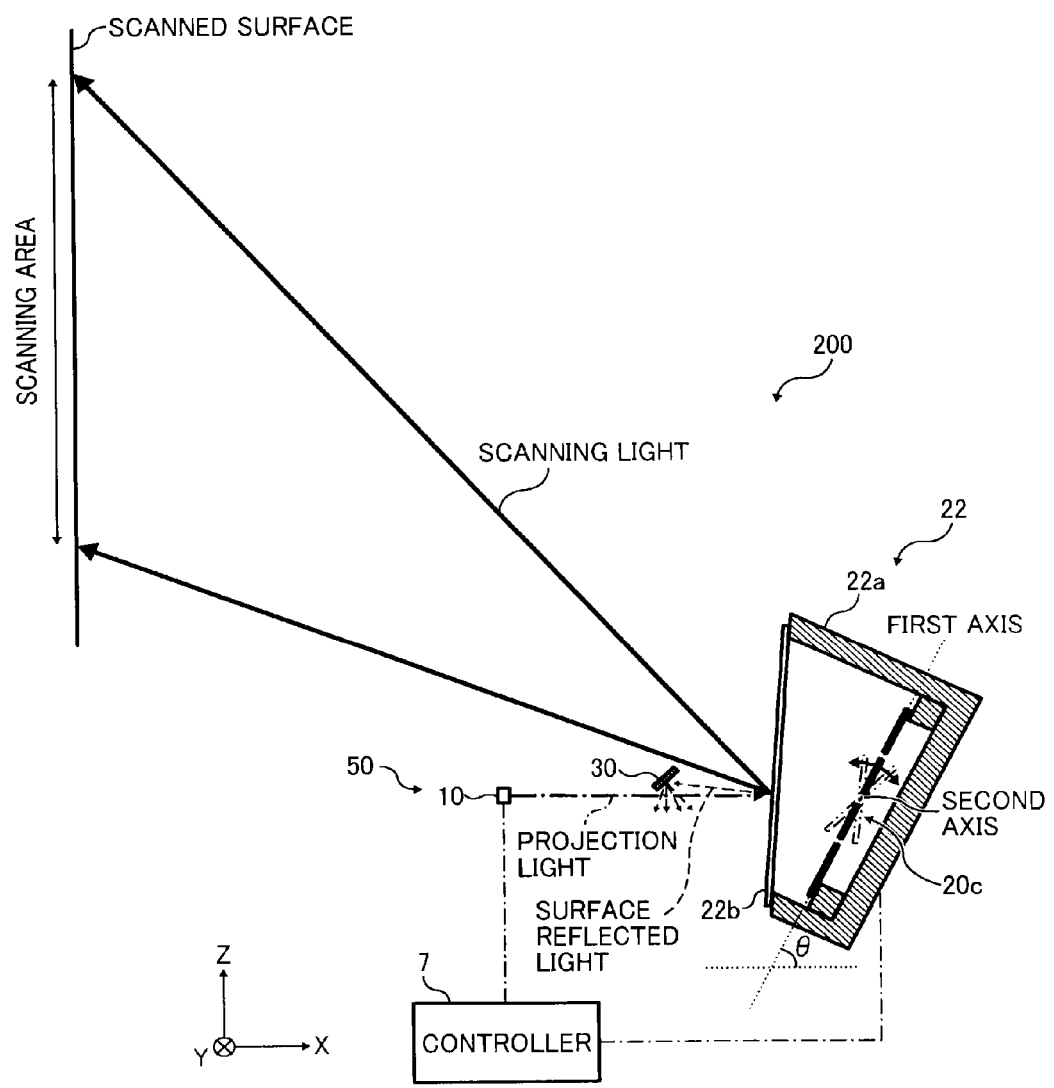
FIG. 5 is a schematic diagram illustrating a configuration of a projector in a first embodiment of the present invention.

As the projector 200 in the second embodiment shown in FIG. 5, regarding the relative positions of the glass cover 22b and the mirror 20c, it is possible to configure these so that the light path of the emitted light and the scanning light are on different sides of the light path of the surface reflected light against a predetermined virtual plane parallel with y axis (from the viewpoint of −y side), i.e., the glass cover 22b and the mirror 20c sandwiches the light path of the surface reflected light from the viewpoint of −y side.

In the second embodiment, since the surface reflected light is shaded by the light shield 30, it is possible to prevent the surface reflected light from entering into the region and returning to the LD 10. In addition, in the second embodiment, compared to the first embodiment, since it is possible to make angle difference between the light path of the surface reflected light and the light path of the scanning light from the viewpoint of −y direction, it is possible to make the tilt angle of the glass cover 20b small, make the optical deflector small, and reduce cost.

Figure 6:
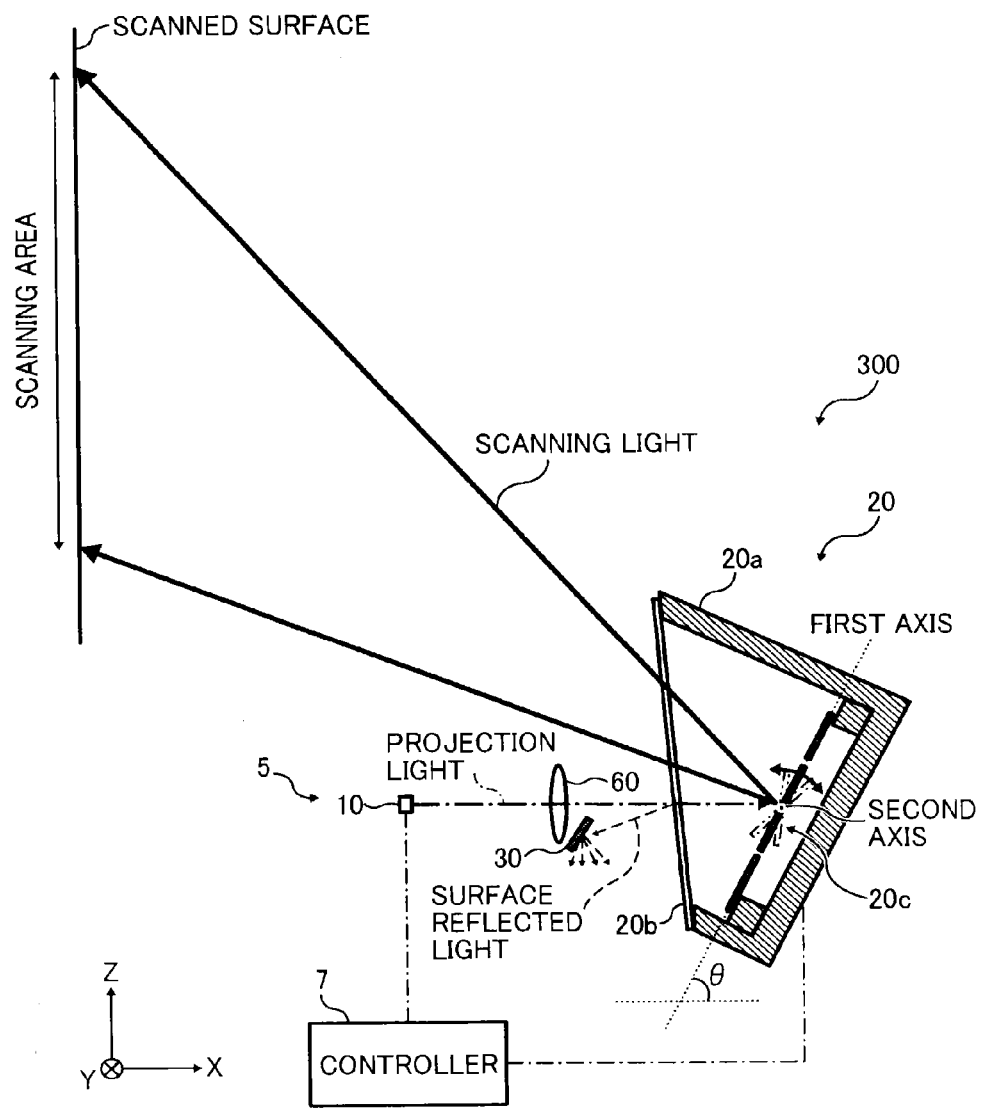
FIG. 6 is a schematic diagram illustrating a configuration of a projector in a second embodiment of the present invention.
Figure 7:
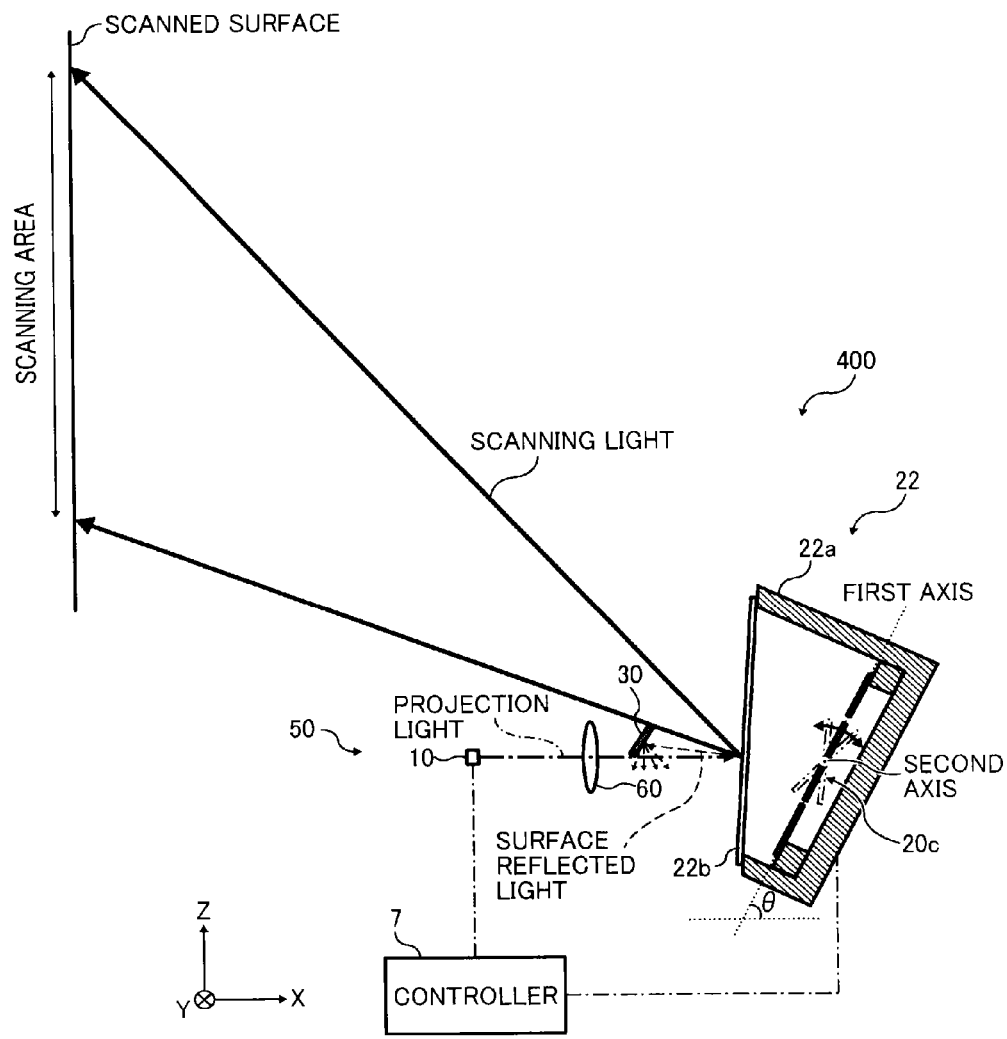
FIG. 7 is a schematic diagram illustrating a configuration of a projector in a third embodiment of the present invention.

As the projector 300 in the third embodiment shown in FIG. 6 and the projector 400 in the fourth embodiment shown in FIG. 7, it is possible to include a lens 60 disposed on the light path between the LD 10 and the light deflectors 20 and 22. Here, a coupling lens that paralyzes the emitted light, diffuses the emitted light a bit, or converges the emitted light a bit is used for the lens 60 for example. It should be noted that other lens can be used for the lens 60.

In the third embodiment and the fourth embodiment, the light shield 30 is disposed between the lens 60 and the light deflectors 20 and 22. As a result, it is possible to prevent the surface reflected light from returning to the LD 10 via the lens 60.

Figure 8:
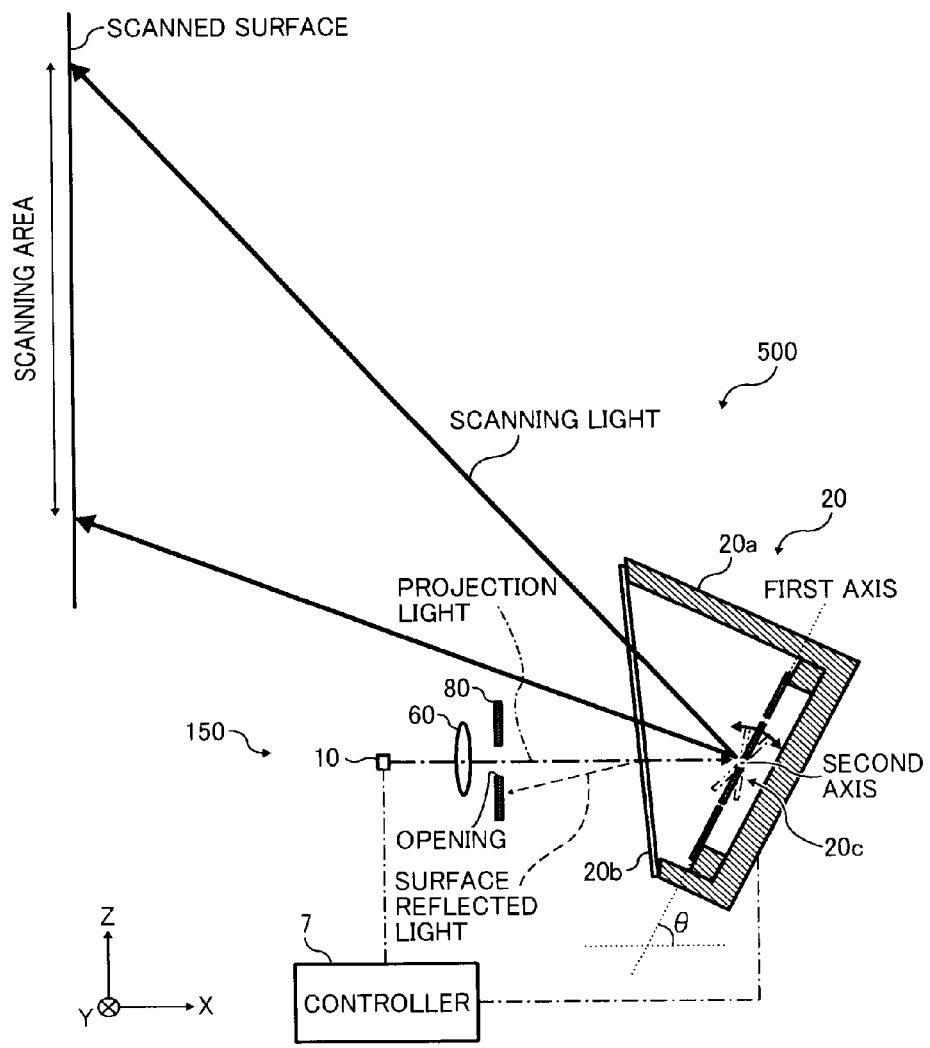
FIG. 8 is a schematic diagram illustrating a configuration of a projector in a fourth embodiment of the present invention.
Figure 9:
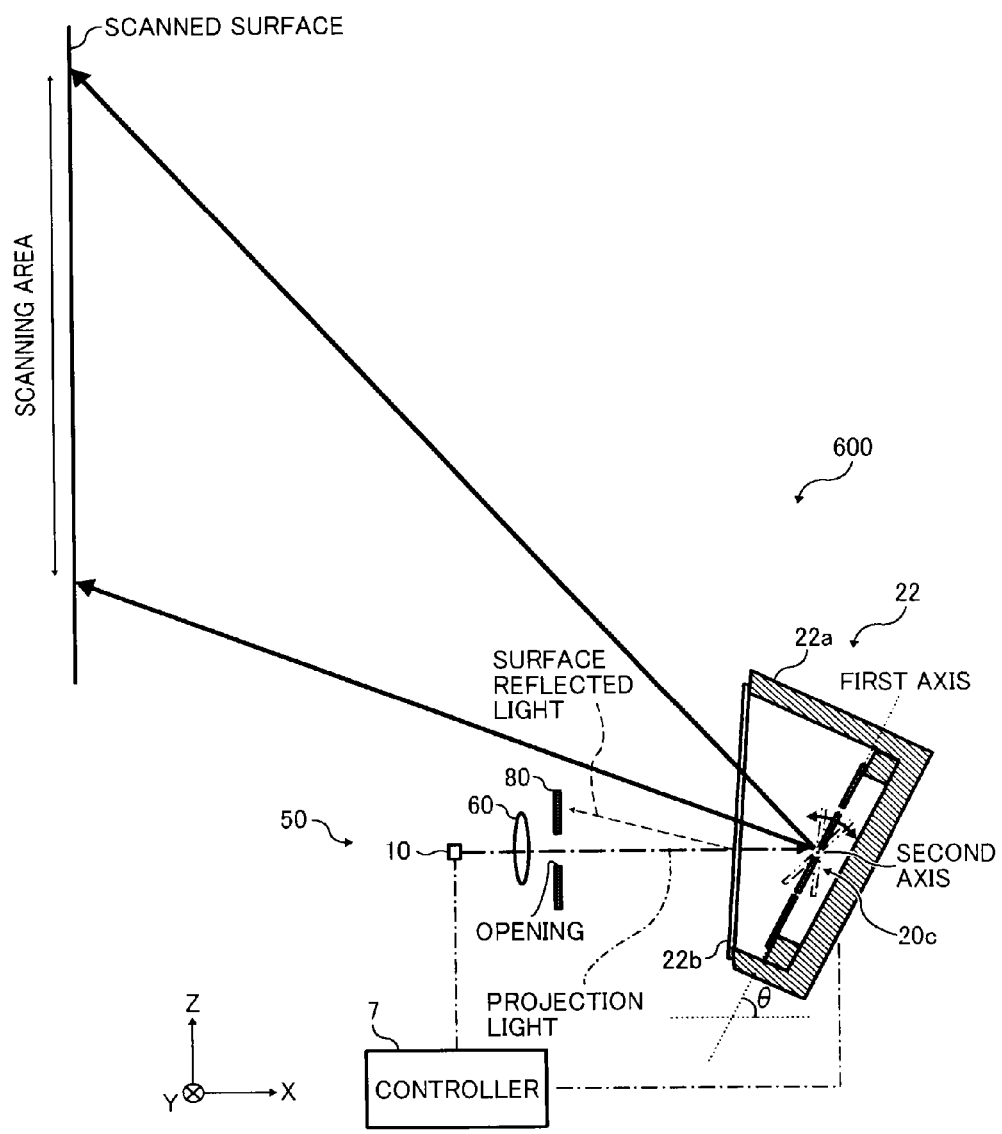
FIG. 9 is a schematic diagram illustrating a configuration of a projector in a fifth embodiment of the present invention.

As the projector 500 in the fifth embodiment shown in FIG. 8 and the projector 600 in the sixth embodiment shown in FIG. 9, it is possible to include a lens 60 disposed on the light path between the LD 10 and the light deflectors 20 and 22 and an opening member 80 disposed on the light path between the lens 60 and the light deflectors 20 and 22. It should be noted that the projectors 500 and 600 do not include the light shield 30.

The opening member 80 includes an opening that passes a part of the emitted light via the lens 60 and trims the emitted light. Surroundings of the opening of the opening member 80 are disposed on the light path of the reflected light of the laser beam that passes the opening through reflected by the surface of the glass cover 20b and 22b (surface reflected light). That is, the opening member 80 includes a light shield that shades the surface reflected light.

In the projector 500 in the fifth embodiment and the projector 600 in the sixth embodiment, since the opening member trims the emitted light and shades the surface reflected light, it is possible to simplify the configuration and reduce cost.

A part of the opening member 80 where the surface reflected light enters can be tilted so that the surface reflected light does not go toward the optical deflector. Alternatively, the part of the opening member 80 where the surface reflected light enters can be a rough surface to scatter light sufficiently. Otherwise, the part of the opening member 80 where the surface reflected light enters can be constructed using material that absorbs at least a part of the surface reflected light.

Figure 10:
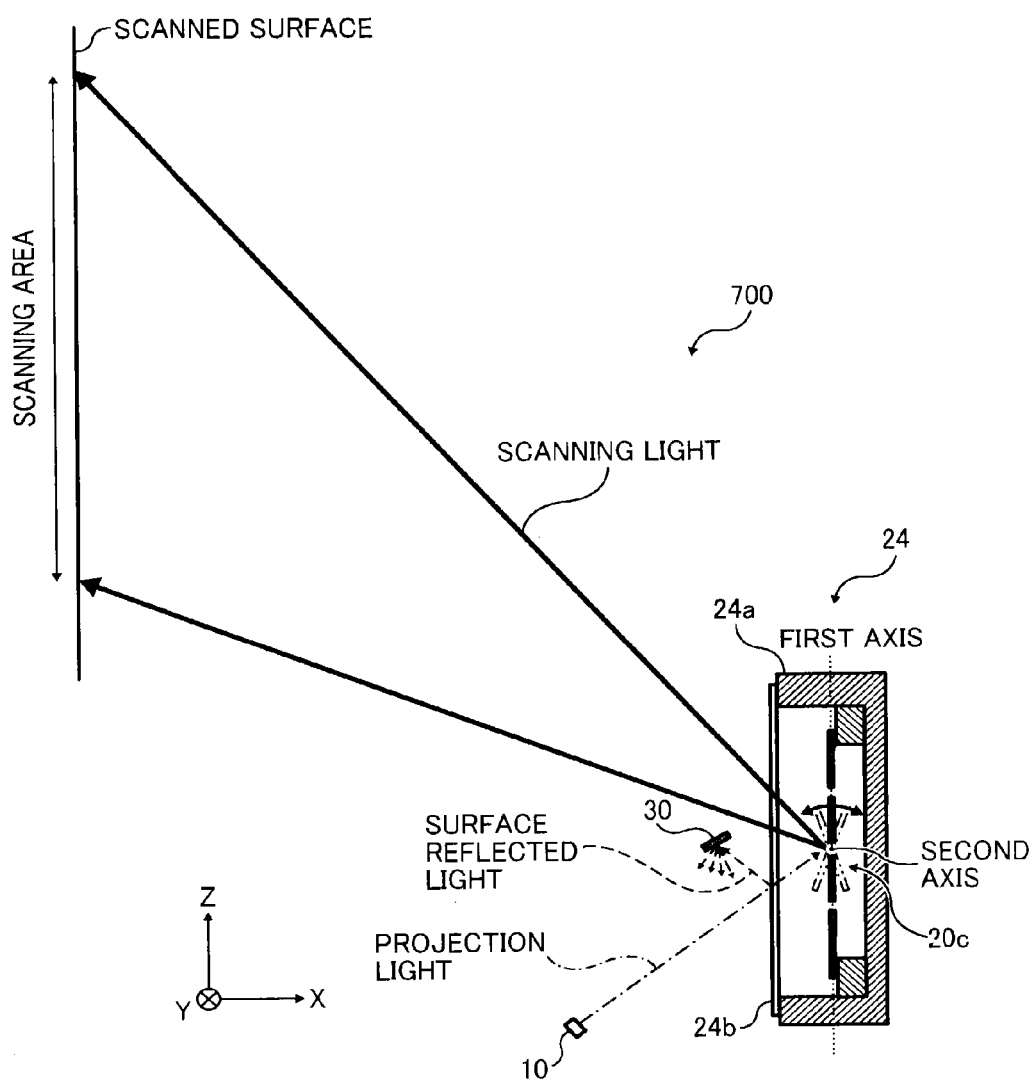
FIG. 10 is a schematic diagram illustrating a configuration of a projector in a sixth embodiment of the present invention.

As the projector 700 in the seventh embodiment shown in FIG. 10, it is possible to lay out the glass cover 24b parallel to the reference plane (the plane that includes the first axis and the second axis).

In the seventh embodiment, the package 24a of the optical deflector 24 is a flat package that consists of a U-shaped member in xz cross-section. Just like the example to be compared shown in FIG. 4, the surface reflected light goes toward the light path of the scanning light.

Therefore, in the seventh embodiment, the light shield 30 is disposed at a position on the light path of the surface reflected light (on its course) and away from the light path of the scanning light. As a result, it is possible to shade the surface reflected light. It is preferable to adjust the posture of the light shield 30 so that the light reflected (scattered) by the light shield 30 does not go toward the LD 10 and the optical deflector 24.

In the seventh embodiment, since it is possible to use the processable small flat package for the optical deflector 24, it is possible to downsize the projector and reduce cost.

Figure 11:
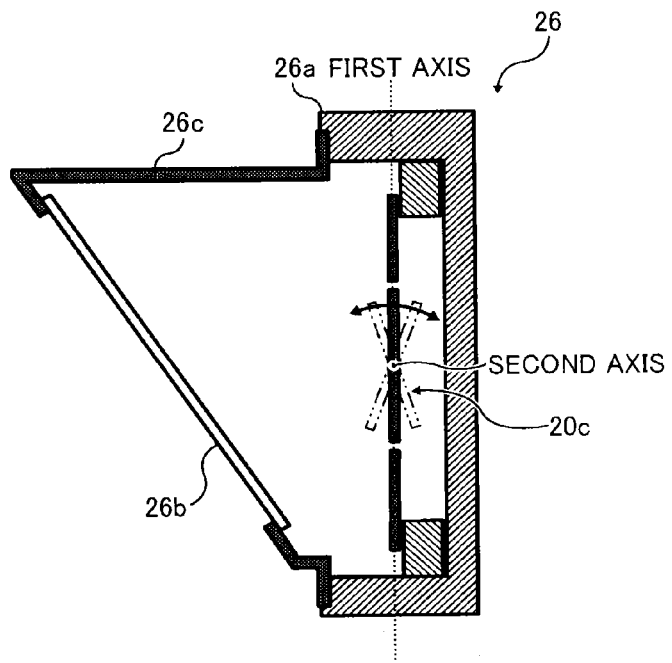
FIG. 11 is a schematic diagram illustrating a configuration of the optical deflector in a seventh embodiment of the present invention.

As the optical deflector 26 in the eighth embodiment shown in FIG. 11, it is possible to connect the package 26a (a first holder) that holds the mirror 20c with the holding member 26c (a second holder) that holds the glass cover 26b.

By adopting the configuration described above, the flat package can be used for the package 26a, and the glass cover 26b can be tilted against the reference plane.

In the seventh embodiment, it is possible to make the package processing easy and acquire the same effects as the embodiments described above.

In addition, in the embodiments described above, the optical deflector is used for the projectors as the image forming apparatus. However, this is an example, and the optical deflector can be used for a head up display apparatus 1000 as the image forming apparatus shown in FIG. 12 for example. The head up display 1000 may be mounted on a vehicle, such as a car, an airplane, and a ship etc.

Figure 12:
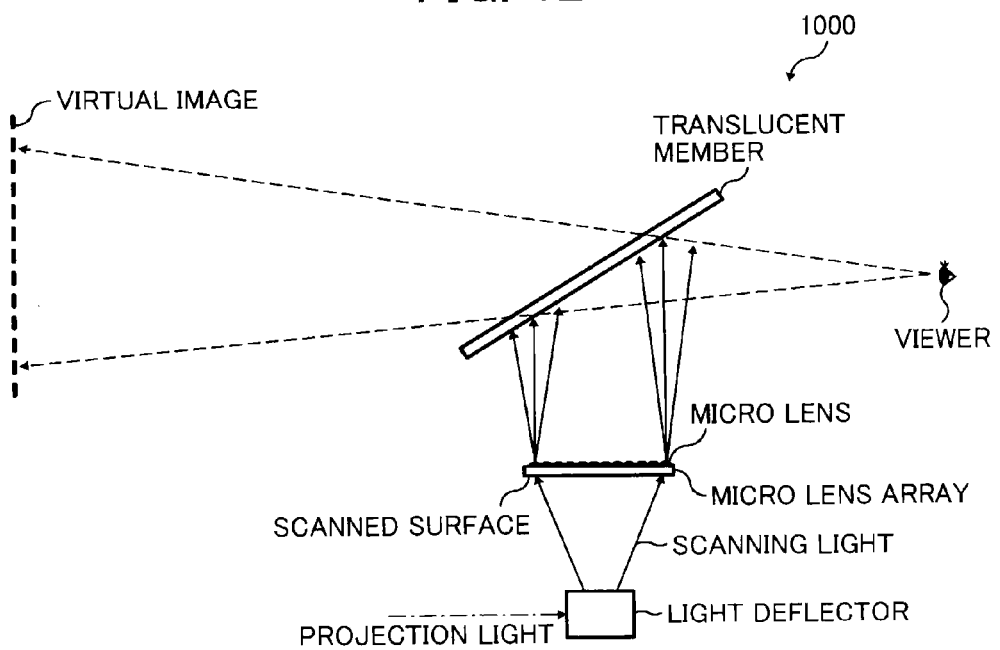
FIG. 12 is a schematic diagram illustrating a head-up display (HUD).

For example, to be described in detail, as shown in FIG. 12, the head up display 1000 includes a micro lens array (light transmission member) that includes multiple micro lenses disposed two-dimensionally disposed on the light path of the laser beam (the scanning light) deflected by the optical deflector and a translucent member (e.g., a combiner) disposed on the light path of the laser beam via the micro lens array. In this case, the surface of the micro lens array (the surface) is scanned two-dimensionally using the laser beam along with deflecting operation of the laser beam around the first axis and the second axis by the light deflector, and the virtual image of the image light is generated. That is, the observer can observe the virtual image of the image light via the translucent member. In this case, since the image light is diffused by the micro lens array, it is possible to reduce so-called speckle noise.

Instead of using the micro lens array, it is possible to use an optical mission member other than the micro lens array (e.g., a transparent screen). For example, it is possible to lay out mirrors such as a concave mirror or a plane mirror on the light path between the light transmission member such as the transmission screen and the translucent member. Otherwise, it is possible to substitute the translucent member with a light transmission window of the car, airplane, or ship (e.g., a plate glass).

As a result, it is possible to provide a car (e.g., an automobile and a train) that includes the head up display 1000 and the light transmission window disposed on the light path of the light that passes through the light transmission member (e.g., the plane glass) after being deflected by the optical deflector in the head up display 1000. In this case, the image light that passes through the light transmission member enters into the light transmission window, and the virtual image of the image light is formed. That is, the observer can observe the virtual image of the image light via the light transmission window.

In addition, it is also possible to provide an image forming apparatus configured the same as the head up display apparatus 1000 in order to observe the virtual image such as a head mount display device and a prompter (a document display device) and a car that includes the image forming apparatus.

It is possible to adopt the optical scanning unit that includes the optical deflector in the embodiments described above for the image forming apparatus such as the printer, copier, and optical plotter and to provide the image forming apparatus.

It is also possible to adopt the optical scanning unit that includes the optical deflector in the embodiments described above for the image forming apparatus such as a microscope and to provide the image forming apparatus.

In the embodiments described above, the relative positions of the glass cover and the mirror is configured so that the light path of the emitted light and the light path of the surface reflected light are located at the same side of the light path of the scanning light from the viewpoint of −y direction. However, it is possible to locate them on different sides of the light path of the scanning light from the viewpoint of −y direction.

In the embodiments described above, the relative positions of the glass cover and the mirror is configured so that the light path of the surface reflected light is deviated from the region in the sub-scanning direction. However, this is an example, and it is not limited to that. For example, it is possible to configure that the light path of the surface reflected light is deviated from the region in the main scanning direction. Otherwise, it is possible to configure that the light path of the surface reflected light is deviated from the region both in the main scanning direction and in the sub-scanning direction. In order to deviate the light path of the surface reflected light from the region in the main scanning direction, it is possible to configure the maximum swing angle (acute angle) of the mirror from the reference plane (swinging pivot) around the first axis to be smaller than an angle between the surface of the glass cover and the plane parallel with the reference plane (acute angle).

In this case, the relative positions of the glass cover and the mirror can be configured so that the light path of the emitted light and the light path of the surface reflected light are located either on the same side or on different sides of the light path of the scanning light from the viewpoint of +z direction. In this case, it is possible to configure the glass cover and mirror so that the light path of the emitted light and the light path of the scanning light are located either on the same side or on different sides of the light path of the surface reflected light from the viewpoint of +z direction.

In the embodiments described above, the glass cover is used as the light transmission window. However, the light transmission window it is not limited to that the glass cover, and alternatively any member that transmits light can be used.

In the embodiments described above, the shape, size, quantity, posture, and layout are configurable appropriately.

In the embodiments described above, the laser diode (LD), i.e., an end face emission laser, is used as the light source of the optical scanning unit. However, this is only an example thereof, and a plane emission laser (VCSEL) or a light source other than the laser can be used.

In the embodiments described above, the controller includes the image processor. However, it is not mandatory.

In the embodiments described above, the LD controller modulates the LD 10 directly based on the image data. Alternatively, for example, it is possible to include an optical modulator that modulates the laser beam emitted from the LD 10 based on the image data. That is, it is possible to adopt an external modulation technique.

In the embodiments described above, one optical deflector that scans two-dimensionally in two scanning directions perpendicular to each other (in the main scanning direction and the sub-scanning direction) is described. Alternatively, it is possible to adopt an optical deflector that scans one-dimensionally in one scanning direction, i.e., the optical deflector that includes a mirror that oscillates around one axis only. Otherwise, it is possible to combine two optical deflectors that include the mirror that oscillates around one axis only to scan two-dimensionally in two scanning directions perpendicular to each other. In case of using the optical deflector that includes the mirror that oscillates around one axis only, by adopting configurations described in the above embodiments, it is possible to prevent the irregular image from generating on the surface and to scan the surface stably.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the distance measurement unit, the user authentication unit, the recovery processor, the print job acquisition unit, the sub-parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. An optical scanning unit, comprising:
   a light source;
   an optical deflector to deflect light from the light source toward a surface to be scanned, the optical deflector including a first side surface and a second side surface parallel to the first side surface, the optical deflector comprising:
   a light transmission window disposed on a light path of light irradiated from the light source, the light transmission window supported by the first and second side surfaces; and
   a rotatable mirror including a reflecting surface that reflects light transmitted through the light transmission window toward the surface; and
   a light shield disposed on a light path of reflected light of the light from the light source that is reflected by a surface of the light transmission window,
   wherein a height of the first side surface is longer than a height of the second side surface such that the light transmission window is not parallel to the rotatable mirror.

2. The optical scanning unit according to claim 1, wherein the mirror is rotatable within a predetermined range around at least one axis, and the reflecting surface is not parallel to the surface of the light transmission window.

3. The optical scanning unit according to claim 1, wherein the light path of the light from the light source and the light path of the reflected light are located on the same side of the light path of the light deflected by the optical deflector.

4. The optical scanning unit according to claim 1, wherein the light path of the light from the light source and the light path of the light deflected by the optical deflector are located on the same side of the light path of the reflected light.

5. The optical scanning unit according to claim 1, further comprising a lens disposed on a light path between the light source and the light deflector,
   wherein the light shield is disposed between the lens and the light transmission window.

6. The optical scanning unit according to claim 5, wherein the lens is a coupling lens, and the light shield is at least partly made of an opening member that includes an opening disposed on a light path of light between the coupling lens and the optical deflector to transmit a part of the light.

7. The optical scanning unit according to claim 1, wherein the optical deflector further comprises:
   a first holder that rotatably holds the mirror; and
   a second holder that holds the light transmission window connected to the first holder.

8. The optical scanning unit according to claim 1, wherein the mirror is rotatable within a first range around a first axis and a second range whose size is different from the first range around a second axis perpendicular to the first axis, wherein the light path of the reflected light is deviated from a region on the surface in a scanning direction corresponding to one of the first axis and the second axis.

9. The optical scanning unit according to claim 1, wherein the light source is a laser.

10. An apparatus, comprising at least one optical scanning unit according to claim 1.

11. The apparatus according to claim 10, further comprising a modulator to modulate light from the light source of the optical scanning unit based on the image data.

12. The apparatus according to claim 11, further comprising a light transmission member that includes the surface, disposed on the light path of the light deflected by the optical deflector in the optical scanning unit.

13. A vehicle, comprising:

the apparatus according to claim 12; and a light transmission window disposed on a light path that passes through the light transmission member after being deflected by the optical deflector in the apparatus.

14. The optical scanning unit according to claim 1, wherein the light shield is an opening member that includes an opening disposed on a light path of light between the coupling lens and the optical deflector to transmit a part of the light.

15. The optical scanning unit according to claim 14, wherein surroundings of the opening of the opening member are disposed on the light path of the reflected light.

16. The optical scanning unit according to claim 14, wherein a part of the opening member is configured to be tilted.

* * * * *